United States Patent [19]
Spicuzza

[11] Patent Number: 5,622,659
[45] Date of Patent: Apr. 22, 1997

[54] METHOD OF PREPARING DOPED LITHIUM FLUORIDE THERMOLUMINESCENT RADIATION DETECTOR

[75] Inventor: William F. Spicuzza, Eastlake, Ohio

[73] Assignee: Victoreen, Inc., Cleveland, Ohio

[21] Appl. No.: 367,874

[22] Filed: Jan. 3, 1995

[51] Int. Cl.$^6$ .................................................... C09K 11/00
[52] U.S. Cl. ........................ 264/21; 264/1.22; 264/1.23; 264/122; 264/125
[58] Field of Search ............................. 264/1.22, 1.23, 264/21, 122, 125

[56] References Cited

U.S. PATENT DOCUMENTS

| | | | |
|---|---|---|---|
| 3,320,180 | 5/1967 | Swineheart | 252/301.4 |
| 3,413,235 | 11/1968 | Jones et al. | 252/301.4 |
| 3,465,074 | 9/1969 | Neuroth et al. | 264/125 |
| 4,129,519 | 12/1978 | Matsuzawa | 252/301.4 H |
| 4,171,400 | 10/1979 | Rosette et al. | 428/357 |
| 4,217,166 | 8/1980 | Nink et al. | 156/605 |
| 4,286,025 | 8/1981 | Grant et al. | 428/542 |
| 4,510,174 | 4/1985 | Holzapfel et al. | 427/65 |
| 5,177,363 | 1/1993 | Velbeck et al. | 250/337 |

Primary Examiner—Christopher A. Fiorilla
Attorney, Agent, or Firm—Vorys, Sater, Seymour & Pease

[57] ABSTRACT

A process for preparing doped lithium fluoride suitable for use as a thermoluminescent radiation-sensitive material includes the sequential steps of:

1) preparing a mixture of microcrystals of lithium fluoride and one or more dopants;

2) heating the mixture at a temperature at which the dopants can diffuse into said microcrystals for a period of time sufficient to produce sensitized microcrystals of lithium fluoride;

3) hot pressing the sensitized lithium fluoride microcrystals for a period of time sufficient to prepare a compact of doped polycrystalline lithium fluoride;

4) cooling the compact to room temperature.

48 Claims, 1 Drawing Sheet

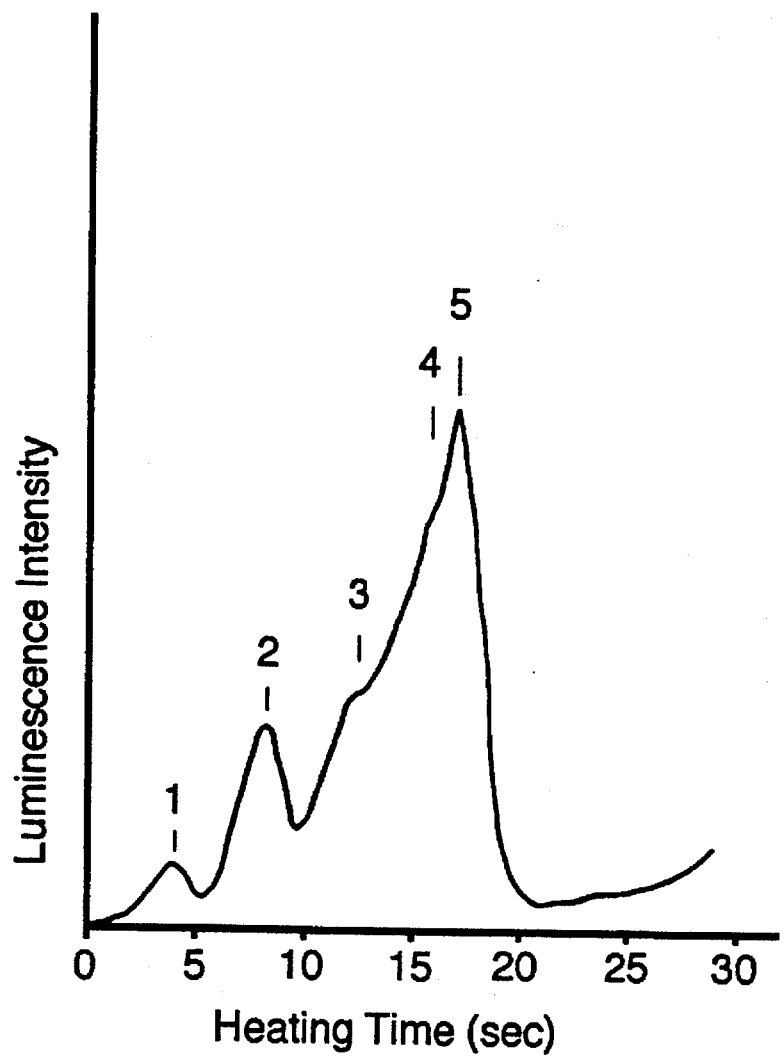

METHOD OF PREPARING DOPED LITHIUM FLUORIDE THERMOLUMINESCENT RADIATION DETECTOR

BACKGROUND OF THE INVENTION

1. Field of the invention

This invention relates to methods of preparing doped crystalline materials and more particularly to preparing sensitized lithium fluoride crystals suitable for use in thermoluminescent radiation detectors.

2. Brief description of the prior art

Thermoluminescent radiation detectors have long been used for dosimetry of ionizing radiation, particularly in personal radiation monitoring badges. A typical thermoluminescent material for use in such badges is a transparent crystalline material, e.g. lithium fluoride, having a low concentration of a dopant, e.g., calcium, magnesium, titanium, manganese, europium, copper, carbon, phosphorus or the like, atomically dispersed therein to form traps within the band gap between the highest filled band and the conduction band of the crystal. When such a doped crystal is irradiated with ionizing radiation, electrons and/or holes are formed within the crystal and migrate until they are trapped by atoms of the dopant. When the irradiated crystal is subsequently heated from room temperature to a temperature of a few hundred degrees Celsius, these trapped electrons and/or holes are thermally excited from the traps and recombine with emission of light. The total amount of light emitted is a measure of the electric charge stored in the traps and, accordingly, is a measure of the dose of radiation to which the sensitized crystal has been subjected.

Dosimeters for use as personal radiation exposure monitoring badges and the like are prepared using chips cut from a grown crystal or chips cut from a pressed slug of ground crystal or by mounting a thin layer of finely divided thermoluminescent crystals on a suitable substrate. These badges are worn for a predetermined period of time after which the thermoluminescence of the radiation sensitive layer is measured to determine the total radiation exposure accumulated over the measuring period.

Conventionally, as disclosed in Swinehart, U.S. Pat. No. 3,320,180, doped LiF for use in thermoluminescent radiation detectors is prepared by melting a mixture of LiF and the desired dopants in the selected proportions and growing a single crystal from the melt, e.g., by the Bridgeman method or the Czochralski method. The doped crystals so prepared are then crushed to an appropriate size and the grains so formed are either mounted on a generally planar surface or pressed to form a slug which is subsequently cut into chips to prepare a thermoluminescent dosimeter. This procedure, while it produces thermoluminescent radiation-sensitive elements of good quality, is time-consuming and requires handling of molten salts. Consequently, the conventional method is rather expensive.

Another method of preparing a thermoluminescent material is disclosed by Matsuzawa in U.S. Pat. No. 4,129,519. According to the process there disclosed, LiF powder is mixed with activator powders, e.g., magnesium fluoride, copper(II) chloride and the like, and heated in a crucible in an inert gas atmosphere at a temperature of 700° C. to 1100° C. for a period of 30 minutes to 3 hours. The material is then granulated, washed successively with acid and water and dried. The examples of the Matsuzawa patent teach heating the mixture of lithium fluoride, magnesium fluoride and a second activator to a temperature of about 1050° C., well above the melting point of LiF (about 845° C.), for a period of 30 minutes, cooling the mixture to room temperature, milling the solid material so prepared to a particle size of 90–200 mesh, washing with 1N hydrochloric acid and water, and drying. The thermoluminescent properties of the material so prepared are described, but the preparation of the thermoluminescent radiation sensitive elements is not described.

Holzapfel et al., U.S. Pat. No. 4,510,174, disclose the preparation of thermoluminescent radiation-sensitive elements in thin wafer form by hot pressing a previously sensitized powder of LiF onto the surface of a solid substrate. The sensitized LiF powder is pressed onto the surface of a substrate, e.g., a surface of aluminum, magnesium, aluminum oxide and the like, at a temperature and pressure sufficient to cause plastic flow of the powder and bonding to the substrate surface. Typically the hot pressing is conducted at a temperature of 400° C. and a pressure of 75 megapascals (MPa) (10,875 pounds per square inch). The sensitized LiF powder used in this process is prepared by conventional means. Consequently, the hot-pressing step is an additional step added to the steps of forming a thin layer detector.

Accordingly, a need has continued to exist for a simpler and more economical method for preparing doped LiF crystals for use in thermoluminescent radiation detectors.

SUMMARY OF THE INVENTION

An improved process for preparing sensitized lithium fluoride has now been developed which comprises the sequential steps of 1) preparing a mixture of microcrystals of lithium fluoride and one or more dopants;

2) heating the mixture at a temperature at which said dopants can diffuse into said microcrystals for a period of time sufficient to produce sensitized microcrystals of lithium fluoride;

3) hot pressing the sensitized lithium fluoride microcrystals for a period of time sufficient to prepare a compact of doped polycrystalline lithium fluoride;

4) cooling said compact to room temperature.

Accordingly it is an object of the invention to provide a process for preparing a sensitized lithium fluoride thermoluminescent radiation detector.

A further object is to provide a process for preparing sensitized lithium fluoride which does not require the use of molten salts.

A further object is to provide a process for preparing sensitized lithium fluoride which requires fewer steps than known methods.

Other objects of the invention will become apparent from the description of the invention which follows.

BRIEF DESCRIPTION OF THE DRAWING

The sole FIGURE is a plot of the luminescence emitted by a specimen of lithium fluoride sensitized with magnesium and titanium after the specimen is first exposed to ionizing radiation and then heated.

DETAILED DESCRIPTION OF THE INVENTION AND PREFERRED EMBODIMENTS

According to the improved process of this invention for preparing crystalline doped LiF suitable for use in thermoluminescent radiation detectors, the LiF does not have to be melted. Instead it has been found that a diffusion doping and hot pressing procedure starting with a mixture of finely divided LiF and appropriate dopants can yield a microcrystalline doped LiF suitable for use as a thermoluminescent radiation-sensitive element in radiation dosimeters.

The starting material for the process is an intimate mixture of finely divided microcrystalline LiF with extremely finely divided solid materials that provide the required dopant atoms. The LiF crystals should be small enough to permit diffusion of the dopants into the body of the crystal within a reasonable period of time at the temperatures at which the sensitization step of the process is conducted. Typically, suitable microcrystals of LiF have a diameter in the range of 10–20 μm.

Any conventional dopant can be introduced by the process of this invention to provide appropriate traps in crystalline LiF. Thus, calcium, magnesium, titanium, manganese, europium, tellurium, copper, carbon, phosphorus and the like can be introduced into crystalline LiF by the process of this invention.

The intimate mixture of LiF and dopants may be prepared by coprecipitation from a solution containing the appropriate salts. For example, a slurry of lithium carbonate powder in an aqueous solution of $MgSO_4$ may be reacted with aqueous HF containing dissolved titanium dioxide to yield a precipitate containing lithium fluoride, magnesium fluoride and titanium fluoride. Alternatively, a solution of the dopants in a suitable salt form, e.g., magnesium fluoride and $H_2TiF_6$, can be mixed with the microcrystalline LiF and the mixture evaporated to dryness. If suitably finely divided solid salts of the dopants can be obtained, they can be directly mixed with the microcrystalline lithium fluoride, e.g., in the form of the fluorides, fluoroaluminates, chlorides, oxides, fluorotitanates or the like.

In a preferred method of preparing the mixture of dopants with microcrystalline lithium fluoride, the LiF microcrystals are mixed with a solution of salts containing the dopants as constituents and the solution is evaporated to dryness to produce an intimate mixture of microcrystalline LiF and precipitated dopant salts. Any procedure that produces a generally equivalent intimate mixture of LiF microcrystals and dopants is also suitable for use in the process of this invention.

The mixed powder of LiF and dopants is then heated to cause the dopants to diffuse into the microcrystals of LiF to produce sensitized microcrystals. The heating step is conducted at temperatures in the range of from about 650° C. to about 10° C. below the melting point of the LiF, which when pure melts at about 845° C. The heating may be conducted in an atmosphere appropriate for the dopant used. For example, the heating may be conducted in an inert atmosphere such as nitrogen, helium, argon or the like, or in vacuum, if the dopant is present in a valence state that is stable under these conditions. Alternatively, the heating may be conducted in an oxidizing atmosphere, e.g., in air, in order to maintain certain dopants in the proper valence state. The heating step is continued for a period of time sufficient to allow the dopants to diffuse into the crystals of LiF to the extent necessary to prepare sensitized microcrystals of LiF. Inasmuch as the rate of diffusion will vary with the temperature of the heating step the duration will vary correspondingly. In general, the diffusion will proceed more rapidly at higher temperatures and the heating step can be shorter. Typically, the heating step will be conducted for a period of time between about 3 hours and about 12 hours at a temperature between about 600° C. and about 835° C. A preferred temperature range for this step of the process is from about 700° C. to about 835° C., and a more preferred temperature for this heating step is about 800° C. A preferred procedure for the sensitizing step of the process comprises heating the mixture of LiF and dopants at a temperature of about 800° C. for a period of about 12 hours.

Subsequent to the sensitizing step of the process of the invention, the sensitized microcrystals of LiF are hot pressed to prepare a consolidated polycrystalline compact or slug. Although the sensitized microcrystals of LiF can be cooled to room temperature and stored for later hot pressing, it is preferred to conduct the hot pressing step immediately after the sensitizing step. In the hot pressing step the sensitized microcrystals of LiF are subjected to a pressure of about 10,000 lbs/in$^2$ to about 25,000 lbs/in$^2$ (7.03 kg/mm$^2$ to 17.58 kg/mm$^2$) at a temperature in the range of from about 350° C. to about 700° C. for a period of time sufficient to produce a relatively dense compact or slug. Typically the hot pressing is conducted for a period of about 15 minutes to about 60 minutes. The pressure may be exerted uniaxially by confining the mixture in a die and compressing it with a ram or by encapsulating the mixture and subjecting it to a hot isostatic pressing process. Preferably the hot pressing step is conducted at a temperature of about 600° C. and the mixture is pressed in a die at a pressure of about 20,000 lbs/in$^2$ (14.06 kg/mm$^2$) for a period of about 30 minutes. During the hot pressing step the microcrystalline LiF is consolidated into a solid compact or slug.

Although it is possible to conduct the hot pressing step at the same temperature as the sensitizing step if the sensitizing step is conducted at a temperature within the range usable for the hot pressing step, it is preferable to reduce the temperature of the sensitized microcrystals after the sensitizing step before conducting the hot pressing step.

In the final step of the process, the pressure is released and the hot pressed compact is allowed to cool to room temperature. The cooling may be conducted by removing the source of heat from the die pressing apparatus and allowing the pressed LiF to cool naturally and continuously. Alternatively, the material may be held at the hot pressing temperature or a temperature between the hot pressing temperature and room temperature for a period of several hours. Such a post-hot pressing step may be conducted for a period of about one to about ten hours. Preferably any post-hot pressing step is conducted at a temperature of about 400° C. for a period of about 5 hours.

After cooling to room temperature the sensitized LiF compact may then be processed in any conventional way to make a thermoluminescent radiation detector. For example, the slug or compact may be crushed and screened and the particles of the selected size may be adhesively bonded to a substrate to make a radiation exposure monitor badge. Alternatively, the slug may be cut into chips which can be used as the sensitive element in a radiation monitor.

The sensitivity and stability of sensitized LiF produced by the method of this invention may be understood by reference to the sole FIGURE which illustrates a typical glow curve which is obtained when a chip or wafer of LiF sensitized with titanium and magnesium by the method of this invention is first exposed to a source of ionizing radiation and then heated while being observed by a photosensitive device to detect the intensity of its thermoluminescence. In the FIGURE the vertical axis represents the instantaneous intensity of the luminescence emitted by the sample chip, which is proportional to the amount of stored charge that is released per unit time, and the horizontal axis represents the temperature of the sample chip as it is rather rapidly heated, typically by contact with an electrically heated substrate. Such a sample of LiF sensitized with magnesium and titanium typically contains traps of five different depths for charge carriers generated by exposure to ionizing radiation in the region studied. As the sensitized and exposed material is heated, the charge carriers in the traps successively acquire enough energy to escape and recombine with carriers of opposite charge to generate photons of light which are emitted and detected by the photosensitive observation device. The luminescence intensity is proportional to the instantaneous rate at which the traps are being depopulated. Consequently, the luminescence intensity curve in the drawing shows five peaks, labeled 1–5 and referred to hereinafter as $P_1$, $P_2$, $P_3$, $P_4$ and $P_5$, corresponding to the emptying of each trap level as the sample is heated. Because the luminescence peaks produced by emptying of the traps tend to overlap under the conditions of rapid heating that are typically used in reading radiation dosimeters, the five peaks are not resolved individually. However, the unresolved peaks are detectable as shoulders on the peaks that are observed, and are numbered on the drawing. The shallow traps, from which the charge carriers are released with relatively little thermal excitation, are emptied at relatively low temperatures and produce the luminescence detected early in the heating cycle. The deeper traps retain the charge carriers until the specimen has reached a higher temperature, i.e., later in the heating cycle. Evidently, the traps that are emptied only at higher temperatures are more stable and less likely to decay when an exposed dosimeter is stored at room temperature. Consequently, it is preferred to produce a sensitized LiF material having a relatively larger proportion of the high-temperature traps. Such a material is characterized by a higher ratio of luminescence intensity of $P_5$ to that of $P_2$, i.e., a greater $P_5/P_2$ ratio.

It has been found that the $P_5/P_2$ ratio of a sample of sensitized LiF prepared by the process of this invention can be affected by the temperatures used in the steps of the process. The preferred high $P_5/P_2$ ratio is favored by using a relatively high temperature in the sensitizing step and in any lower temperature holding period that precedes the hot pressing step.

It will be recognized by the skilled practitioner that the sensitivity and $P_5/P_2$ ratio of LiF sensitized with magnesium and titanium is affected by the total and relative concentration of the dopant atoms. The ultimate concentration of dopants in the finished sensitized LiF will depend on the amount of dopant added to the microcrystalline lithium fluoride at the beginning of the process, the amounts of dopant that may be lost in preparing the mixture for the sensitizing heating step, and the efficiency of the diffusion of dopant into the microcrystals of LiF during the sensitizing heating step. The amount of dopants in the final sensitized material can be determined by conventional analytical techniques. However, the losses of dopant, e.g., when the starting mixture is prepared by coprecipitation of LiF and dopant salts, and the efficiency of diffusion during the steps of the procedure cannot be easily predicted. Consequently, it will be recognized that some experimentation with the proportions of dopant added to the LiF at the start of the process will be required in order to determine the optimum amount of dopant for the best sensitivity and $P_5/P_2$ ratio. Typically, for a LiF sensitized with magnesium and titanium prepared by the process of the invention, a final proportion of about 9 parts per million (ppm) of titanium, calculated as TiO2, and about 600 ppm of magnesium, calculated as $MgF_2$, will yield a sensitized LiF having adequate sensitivity for use in conventional dosimeters.

It will also be appreciated by the skilled practitioner that measurement of temperature of materials held in conventional dies and presses is difficult and necessarily inexact. The temperature sensitive elements, e.g., thermocouples, of the thermometric apparatus cannot be embedded in the material itself without interfering with the process. Accordingly, temperature measurements are typically made at the periphery of the die itself, and these may be somewhat lower than the temperature at the center of the die where the material to be processed is confined. It is also not possible to assure that the LiF being processed within the die has a uniform temperature, and the possible temperature variations may result in a finished compact or slug that does not have uniform properties throughout. Consequently, it will be understood by the practitioner that experimentation with a particular die and press combination will be necessary to determine the proper measured temperatures for the process steps in order to yield a finished compact of sensitized LiF having optimum sensitivity and uniformity. In particular, when a die of larger diameter, e.g., about 3½ inches (89.5 mm) is used the measured die temperatures may be lower for the same results as when a die of smaller diameter, e.g., about 1½ inches is used, because the thermometric elements are located further from the center of the material being treated. Consequently, experimentation to determine the best measured temperatures for the best results with a given apparatus will require some experimentation.

The practice of the invention will be illustrated by the following examples which are provided for illustration only and are not to be interpreted as limiting the scope of the invention.

EXAMPLE 1

This example illustrates the preparation of a doped LiF radiation detector according to the invention.

Thirteen milliliters of a solution of $H_2TiF_6$ in HF containing 0.000065 grams of $TiO_2$ per milliliter were placed in a 250 milliliter beaker made of poly(tetrafluoroethylene), and ten milliliters of 48% HF were added. To this solution was added 0.026 grams of $MgF_2$ (99.9% optical grade). The solution was heated to fuming and 65 grams of LiF powder having a particle size of approximately 10 μm to 20 μm was added to take up the solution. This mixture was heated with intermittent stirring for two hours. The powder obtained was placed in a 1000 milliliter beaker (poly(tetrafluoroethylene)) to increase the surface area and dried under vacuum at 65° C. for sixteen hours.

The doped LiF powder so prepared was placed into a thoroughly dried cylindrical die having a diameter of 1.5 inches (38.1 mm) made of stainless steel and provided with an electrical resistance heating arrangement comprising surrounding heating coils and insulation. The die was located on the anvil of a hydraulic press where the contents could be subjected to pressure exerted by the ram of the press. The die was heated to a temperature of about 800° C. and maintained at that temperature for a period of about 12 hours. The temperature of the die was then reduced to about 600° C. and the contents of the die were hot pressed by exerting a force with the ram of about 10 to 15 tons (9070 to 13,605 kilograms) for a period of about 30 minutes. The pressure was released and the temperature of the die was then reduced to about 400° C. and held for a period of about 5 hours. The resistance heater was then shut off, and the die containing the doped LiF was then allowed to cool to room temperature. The doped LiF slug was then removed from the die. The pressed slug was cut into chips one-eighth inch square and 0.35 inches thick. The cut chips were annealed for one hour at 400° C. and two hours at 100° C. The chips were subjected to total radiation dose of one rad using a Cesium-137 source and then read on a Victoreen Model 2800 M Thermoluminescence Dosimeter Reader. The glow curve, i.e., the plot of luminescence versus temperature as the irradiated chip is heated in the dosimeter reader, is similar to that observed for a conventional sensitized single-crystal LiF dosimeter chip, e.g., such as prepared by the method of Swinehart, U.S. Pat. No. 3,320,180. The sensitivity of the dosimeter chip was also comparable to that of a conventional single-crystal chip.

EXAMPLE 2

This example illustrates another method of preparing a doped LiF radiation detector according to the invention.

Nine milliliters of a solution of $H_2TiF_6$ in HF containing 0.000065 grams of $TiO_2$ per milliliter were placed in a 250 milliliter beaker made of poly(tetrafluoroethylene), and fourteen milliliters of 48% HF were added. To this solution was added 0.026 grams of $MgF_2$ (99.9% optical grade). The solution was heated to fuming and 65 grams of LiF powder having a particle size of approximately 10 μm to 20 μm was added to take up the solution. This mixture was heated with intermittent stirring for about two and one-half hours. The powder obtained was placed in a 1000 milliliter beaker (poly(tetrafluoroethylene)) to increase the surface area and dried under vacuum at 65° C. for sixteen hours.

The doped LiF powder so prepared was placed into a thoroughly dried cylindrical die having a diameter of 1.5 inches (38.1 mm) made of stainless steel and provided with an electrical resistance heating arrangement. The die was located on the anvil of a hydraulic press where the contents could be subjected to pressure exerted by the ram of the press. The die was heated to a temperature of about 800° C. and maintained at that temperature for a period of about 12 hours. The temperature of the die was then reduced to about 500° C. and held for five hours. The contents of the die were then hot pressed by exerting a force with the ram of about 10 to 15 tons (9070 to 13,605 kilograms) for a period of about 30 minutes at a temperature of 500° C. The pressure was released, the resistance heater was then shut off, and the die containing the doped LiF was then allowed to cool to room temperature. The doped LiF slug was then removed from the die. The pressed slug was cut into chips one-eighth inch (3.2 millimeters) square and 0.35 inches (8.9 millimeters) thick. The cut chips were annealed for one hour at 400° C. and two hours at 100° C. The chips were subjected to total radiation dose of one rad using a Cesium-137 source and then read on a Victoreen Model 2800 M Thermoluminescence Dosimeter Reader, as in Example 1. The glow curve, i.e., the plot of luminescence versus temperature as the irradiated chip is heated in the dosimeter reader, was similar to that observed for a conventional sensitized single-crystal LiF dosimeter chip, e.g., such as prepared by the method of Swinehart, U.S. Pat. No. 3,320,180. The sensitivity of the dosimeter chip was also comparable to that of a conventional single-crystal chip.

EXAMPLES 3-5

These examples illustrate the effect of the temperature of the sensitization step on the sensitivity and $P_5/P_2$ ratio of the sensitized LiF prepared by the process of this invention.

Three samples were prepared by the general method of Example 1 wherein the sensitizing temperature was varied and the sensitivity and $P_5/P_2$ ratio were measured. In each example, the sample was heated for 12 hours at the chosen sensitizing temperature, cooled to 600° C.–650° C. and hot pressed at that temperature, cooled to 400° C., held at that temperature for 5 hours and then cooled to room temperature. The results of these experiments are summarized in Table 1 below.

TABLE 1

| Example | Sensitizing temperature | Sensitivity C/mg/R | $P_5/P_2$ ratio |
|---|---|---|---|
| 3 | 650° C. | $2.45 \times 10^{-9}$ | 0.66 |
| 4 | 750° C. | $5.0 \times 10^{-9}$ | 1.48 |
| 5 | 800° C. | $5.59 \times 10^{-9}$ | 1.88 |

The results of these experiments show that the sensitivity and the $P_5/P_2$ ratio both increase as the sensitizing temperature increases toward the melting point of the LiF.

EXAMPLES 6-7

These examples illustrate the effect of the concentration of magnesium fluoride on the sensitivity and $P_5/P_2$ ratio of the sensitized LiF prepared by the process of this invention.

Two samples were prepared by a variation of the general method of Example 2 wherein amount of $MgF_2$ was varied and the sensitivity and $P_5/P_2$ ratio were measured. In each example, the sample was heated for 12 hours at a sensitizing temperature of 800° C., cooled to 500° C. and held at that temperature for 5 hours, pressed for one-half hour at 500° C., using a load of 10–15 tons (9,091–13,636 kg) on a 1½-inch (38.1 mm) die, and then cooled to room temperature. The results of these experiments are summarized in Table 2 below.

TABLE 2

| Example | Proportion of $MgF_2$ | Sensitivity C/mg/R | $P_5/P_2$ ratio |
|---|---|---|---|
| 6 | 600 ppm | $5.12 \times 10^{-9}$ | 3.05 |
| 7 | 400 ppm | $5.22 \times 10^{-9}$ | 1.89 |

The results of these experiments show that the sensitivity is affected only to a small extent by the amount of $MgF_2$ incorporated, at least in this conventional range, while the $P_5/P_2$ ratio increases as the amount of $MgF_2$ is increased.

EXAMPLES 8-10

These examples illustrate the effect of the concentration of titanium dioxide on the sensitivity and $P_5/P_2$ ratio of the sensitized LiF prepared by the process of this invention.

Three samples were prepared by the general method of Examples 6–7 wherein amount of $TiO_2$ was varied and the sensitivity and $P_5/P_2$ ratio were measured. In each example, the sample was heated for 12 hours at a sensitizing temperature of 800° C., cooled to 400° C. and held at that temperature for 5 hours, then pressed for one-half hour at 400° C., using a load of 10–15 tons (9,091–13,636 kg) on a 1½-inch (38.1 mm) die, and cooled to room temperature. The results are summarized in Table 3 below.

TABLE 3

| Example | Proportion of TiO$_2$ | Sensitivity C/mg/R | P$_5$/P$_2$ ratio |
|---|---|---|---|
| 8 | 6.5 ppm | 4.51 × 10$^{-9}$ | 1.72 |
| 9 | 9 ppm | 5.36 × 10$^{-9}$ | 1.59 |
| 10 | 13 ppm | 5.54 × 10$^{-9}$ | 1.0 |

The results of these experiments show that the sensitivity decreases as the amount of TiO$_2$ is decreased below about 9 ppm, while the P$_5$/P$_2$ ratio increases as the amount of TiO$_2$ is decreased. Consequently, an intermediate amount of TiO$_2$, e.g., about 9 ppm is preferred under these conditions.

EXAMPLES 11–14

These examples illustrate the effect of the holding and pressing temperature in the method of Example 2 on the sensitivity and P$_5$/P$_2$ ratio of the sensitized LiF prepared by the process of this invention.

Four samples were prepared by the general method of Examples 6–7 wherein the sensitizing temperature held constant and the temperature at which the sensitized LiF was held before hot pressing was varied, and the sensitivity and P$_5$/P$_2$ ratio were measured. In each example, the sample was heated at a sensitizing temperature of 800° C. for 12 hours, cooled to the holding temperature and held at that temperature for 5 hours, then hot pressed at the holding temperature, using a load of 10–15 tons (9,091–13,636 kg) on a 1½-inch (38.1 mm) die, and cooled to room temperature. The results of these experiments are summarized in Table 4 below.

TABLE 4

| Example | Holding temperature | Sensitivity C/mg/R | P$_5$/P$_2$ ratio |
|---|---|---|---|
| 11 | 600° C. | 4.81 × 10$^{-9}$ | 2.10 |
| 12 | 550° C. | 5.45 × 10$^{-9}$ | 1.87 |
| 13 | 500° C. | 5.13 × 10$^{-9}$ | 1.5 |
| 14 | 400° C. | 5.95 × 10$^{-9}$ | 1.38 |

The results of these experiments show that the sensitivity shows no certain trend as the holding and pressing temperature is increased, while the P$_5$/P$_2$ ratio increases as the holding temperature increases.

EXAMPLE 15

This example illustrates the preparation of a doped lithium fluoride by the method of the invention using a larger die and a slightly varied method. A mixture of microcrystalline LiF with titanium and magnesium dopant salts was prepared by the method described in Example 1. The mixture was placed in a die having a diameter of about 3½ inches (88.9 mm) positioned in a hydraulic press as in Example 1. The sample was heated at a die temperature of 675° C. for a period of 12 hours, then cooled to a die temperature of 600° C. and held at that temperature for 20 hours, then cooled to a die temperature of 350° C. and held at that temperature for 10 hours, and then hot pressed at 350° C. for one-half hour and thereafter cooled to room temperature. This procedure incorporating a holding step at a temperature intermediate between the sensitizing temperature and the hot pressing temperature appears to provide a slug with a more uniform sensitivity throughout.

The invention having now been fully described, it should be understood that it may be embodied in other specific forms or variations without departing form its spirit or essential characteristics. Accordingly, the embodiments described above are to be considered in all respects as illustrative and not restrictive, the scope of the invention being indicated by the appended claims rather than the foregoing description, and all changes which come within the meaning and range of equivalency of the claims are intended to be embraced therein.

I claim:

1. A process for preparing a sensitized lithium fluoride compact suitable for use in preparing a thermoluminescent radiation detector consisting essentially of the steps of:
   1) preparing a mixture of microcrystals of undoped lithium fluoride and one or more dopants;
   2) heating the mixture at a temperature at which said dopants can diffuse into said microcrystals for a period of time sufficient to produce sensitized microcrystals of lithium fluoride;
   3) hot pressing the sensitized lithium fluoride microcrystals for a period of time sufficient to prepare a compact of doped polycrystalline lithium fluoride;
   4) cooling said compact to room temperature.

2. The process of claim 1 wherein said dopants are selected from the group consisting of calcium, magnesium, titanium, manganese, europium, tellurium, copper, carbon, and phosphorus.

3. The process of claim 2 wherein said heating in step 2) is conducted at a temperature in a range from about 600° C. to about 10° C. below the melting point of lithium fluoride.

4. The process of claim 3 wherein said heating is conducted at a temperature in a range of from about 700° C. to about 830° C.

5. The process of claim 3 wherein said heating is conducted at a temperature of about 800° C.

6. The process of claim 2 wherein said heating in step 2) is conducted for a period of from about 8 hours to about 24 hours.

7. The process of claim 6 wherein said heating in step 2) is conducted for a period of about 12 hours.

8. The process of claim 2 wherein said heating in step 2) is conducted at a temperature in a range of about 700° C. to about 830° C. for a period of about 8 hours to about 16 hours.

9. The process of claim 2 wherein said heating in step 2) is conducted at a temperature of about 800° C. for a period of about 12 hours.

10. The process of claim 2 wherein said hot pressing is conducted at a temperature in a range from about 350° C. to about 700° C.

11. The process of claim 10 wherein said hot pressing is conducted at a temperature in a range from about 400° C. to about 600° C.

12. The process of claim 10 wherein said hot pressing is conducted at a temperature of about 500° C.

13. The process of claim 2 wherein said hot pressing is conducted for a period of time from about 15 minutes to about one hour.

14. The process of claim 13 wherein said hot pressing is conducted for a period of about one-half hour.

15. The process of claim 2 wherein said hot pressing is conducted at a temperature in a range from about 400° C. to about 600° C. for a period of time from about 15 minutes to about one hour.

16. The process of claim 15 wherein said hot pressing is conducted at a temperature of about 500° C. for a period of about one-half hour.

17. The process of claim 2 wherein said heating in step 2) is conducted at a temperature in a range of from about 600° C. to about 10° C. below the melting point of lithium fluoride for a period of from about 8 hours to about 24 hours and said hot pressing in step 3) is conducted at a temperature of from about 350° C. to about 700° C. for a period of about 15 minutes to about one hour.

18. The process of claim 2 wherein said heating in step 2) is conducted at a temperature in a range of from about 700° C. to about 830° C. for a period of from about 8 hours to about 24 hours and said hot pressing in step 3) is conducted at a temperature of from about 400° C. to about 600° C. for a period of about 15 minutes to about one hour.

19. The process of claim 2 wherein said heating in step 2) is conducted at a temperature of about 800° C. for a period of about 12 hours and said hot pressing in step 3) is conducted at a temperature of about 500° C. for a period of about one-half hour.

20. The process of claim 1 wherein said dopants are titanium and manganese.

21. The process of claim 1 wherein said heating in step 2) is conducted at a temperature in a range from about 600° C. to about 10° C. below the melting point of lithium fluoride.

22. The process of claim 21 wherein said heating is conducted at a temperature in a range of from about 700° C. to about 830° C.

23. The process of claim 21 wherein said heating is conducted at a temperature of about 800° C.

24. The process of claim 1 wherein said heating in step 2) is conducted for a period of from about 8 hours to about 24 hours.

25. The process of claim 24 wherein said heating in step 2) is conducted for a period of about 12 hours.

26. The process of claim 1 wherein said heating in step 2) is conducted at a temperature in a range of about 700° C. to about 830° C. for a period of about 8 hours to about 16 hours.

27. The process of claim 1 wherein said heating in step 2) is conducted at a temperature of about 800° C. for a period of about 12 hours.

28. The process of claim 1 wherein said hot pressing is conducted at a temperature in a range from about 350° C. to about 700° C.

29. The process of claim 8 wherein said hot pressing is conducted at a temperature in a range from about 400° C. to about 600° C.

30. The process of claim 28 wherein said hot pressing is conducted at a temperature of about 500° C.

31. The process of claim 1 wherein said hot pressing is conducted for a period of time from about 15 minutes to about one hour.

32. The process of claim 31 wherein said hot pressing is conducted for a period of about one-half hour.

33. The process of claim 1 wherein said hot pressing is conducted at a temperature in a range from about 400° C. to about 600° C. for a period of time from about 15 minutes to about one hour.

34. The process of claim 33 wherein said hot pressing is conducted at a temperature of about 500° C. for a period of about one-half hour.

35. The process of claim 1 wherein said heating in step 2) is conducted at a temperature in a range of from about 600° C. to about 10° C. below the melting point of lithium fluoride for a period of from about 8 hours to about 24 hours and said hot pressing in step 3) is conducted at a temperature of from about 350° C. to about 700° C. for a period of about 15 minutes to about one hour.

36. The process of claim 1 wherein said heating in step 2) is conducted at a temperature in a range of from about 700° C. to about 830° C. for a period of from about 8 hours to about 24 hours and said hot pressing in step 3) is conducted at a temperature of from about 400° C. to about 600° C. for a period of about 15 minutes to about one hour.

37. The process of claim 1 wherein said heating in step 2) is conducted at a temperature of about 800° C. for a period of about 12 hours and said hot pressing in step 3) is conducted at a temperature of about 500° C. for a period of about one-half hour.

38. The process of claim 1 wherein said hot pressing in step 3) is conducted at a temperature lower than the temperature of step 2) and said sensitized microcrystals are cooled after step 2) to the temperature of said hot pressing step 3).

39. The process of claim 38 wherein said sensitized microcrystals are cooled from said temperature of step 2) to said lower temperature of step 3) continuously.

40. The process of claim 38 wherein said sensitized microcrystals are cooled from the heating temperature of step 2) to the hot pressing temperature of step 3) continuously over a period of from about 0.5 hours to about 6 hours.

41. A process for preparing a sensitized lithium fluoride compact suitable for use in preparing a thermoluminescent radiation detector consisting essentially of the steps of:
  1) preparing a mixture of microcrystals of undoped lithium fluoride and one or more dopants;
  2) heating the mixture at a temperature at which said dopants can diffuse into said microcrystals for a period of time sufficient to produce sensitized microcrystals of lithium fluoride;
  3) hot pressing the sensitized lithium fluoride microcrystals for a period of time sufficient to prepare a compact of doped polycrystalline lithium fluoride;
  4) holding said compact prepared in step 3) at a temperature below the hot-pressing temperature and above room temperature for a period of time from about 1 hour to about 12 hours; and
  5) cooling said compact to room temperature.

42. A process for preparing a sensitized lithium fluoride compact suitable for use in preparing a thermoluminescent radiation detector consisting essentially of the steps of:
  1) preparing a mixture of microcrystals of undoped lithium fluoride and one or more dopants;
  2) heating the mixture at a temperature at which said dopants can diffuse into said microcrystals for a period of time sufficient to produce sensitized microcrystals of lithium fluoride;
  3) cooling said sensitized microcrystals to the temperature of hot-pressing step 4) and holding the temperature of said sensitized microcrystals constant at a temperature intermediate between the temperature of step 2) and the temperature of said hot pressing step 4) for a period of time sufficient to produce a compact having greater uniformity of sensitivity as compared with a compact produced when said temperature of said microcrystals is not held constant at a temperature intermediate between the temperature of step 2) and the temperature of said hot-pressing step 4);
  4) hot pressing the sensitized lithium fluoride microcrystals for a period of time sufficient to prepare a compact of doped polycrystalline lithium fluoride wherein said hot-pressing is conducted at a temperature lower than the temperature of step 2); and
  5) cooling said compact to room temperature.

43. The process of claim 42 wherein said intermediate temperature is held constant for a period of from about 0.5 hours to about 24 hours.

44. The process of claim 42 wherein said sensitized microcrystals are cooled from said temperature of step 2) to said lower temperature of step 3) continuously.

45. The process of claim 42 wherein said sensitized microcrystals are cooled from the heating temperature of step 2) to the hot pressing temperature of step 3) continuously over a period of from about 0.5 hours to about 6 hours.

46. The process of claim 42 wherein the temperature of said sensitized microcrystals is held constant at a temperature intermediate between the temperature of step 2) and the temperature of said hot pressing step 3) for a predetermined period of time.

47. The process of claim 46 wherein said intermediate temperature is held constant for a period of from about 0.5 hours to about 24 hours.

48. A process for preparing a sensitized lithium fluoride compact suitable for use in preparing a thermoluminescent radiation detector consisting essentially of the steps of:

1) preparing a mixture of microcrystals of undoped lithium fluoride and one or more dopants selected from the group consisting of calcium, magnesium, titanium, manganese, europium, tellurium, copper, carbon, and phosphorus;

2) heating the mixture at a temperature at which said dopants can diffuse into said microcrystals for a period of time sufficient to produce sensitized microcrystals of lithium fluoride;

3) hot pressing the sensitized lithium fluoride microcrystals for a period of time sufficient to prepare a compact of doped polycrystalline lithium fluoride;

4) holding said compact at a temperature in a range of from the hot-pressing temperature to room temperature for a period of time from about 1 hour to about 12 hours before being cooled to room temperature; and 5) cooling said compact to room temperature.

* * * * *